Sept. 22, 1970     H. E. KLINKENBERG     3,530,416
MAGNETIC ELEMENT FOR STATIONARY FIELD CLUTCHES
Filed Dec. 13, 1968
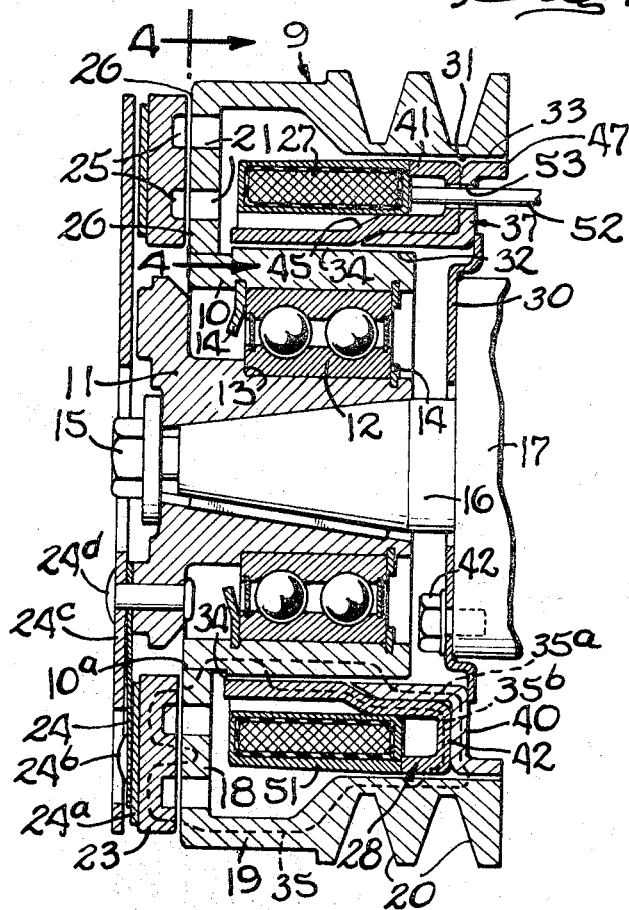
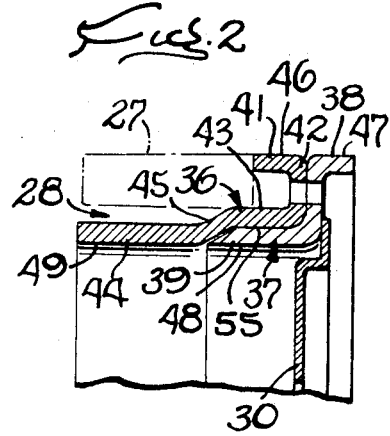
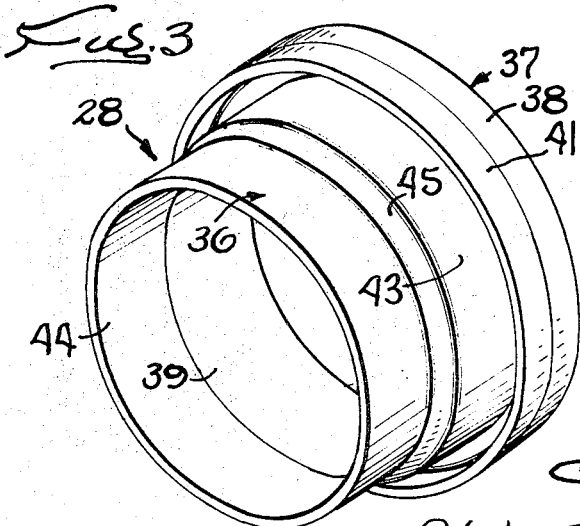
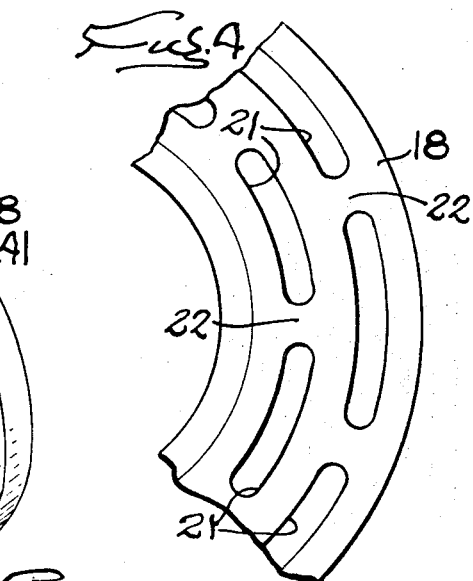
INVENTOR
Hubert E. Klinkenberg
By Wolfe, Hubbard, Voit & Osann
ATTORNEYS United States Patent Office 3,530,416
Patented Sept. 22, 1970

3,530,416
MAGNETIC ELEMENT FOR STATIONARY
FIELD CLUTCHES
Hubert E. Klinkenberg, Beloit, Wis., assignor to Warner Electric Brake & Clutch Company, South Beloit, Ill., a corporation of Delaware
Filed Dec. 13, 1968, Ser. No. 783,483
Int. Cl. H01f 7/08
U.S. Cl. 335—281                9 Claims

ABSTRACT OF THE DISCLOSURE

In a magnetic friction clutch of the stationary field type, the inner and outer cylindrical air gaps are defined between a driving annulus of magnetic material and U-shaped radial cross section and a stationary pole ring supporting the energizing winding and composed of unmachined rings stamped out of sheet metal and nested and secured together and dividing the toroidal flux circuit into parallel paths.

BACKGROUND OF THE INVENTION

This invention relates to magnetic friction clutches of the stationary field type in which a flux path of toroidal shape encircling a multiple turn annular winding is formed by a generally flat armature ring, usually the driven part of the clutch, adapted for axial gripping engagement with the pole faces of a driving rotor ring of U-shaped radial cross section. The flux toroid is completed by a stationarily mounted ring of generally L-shaped radial cross section having cylindrical inner and outer surfaces telescoped with and separated from the concentric legs of the rotor by narrow radial gaps which are of substantially larger area than the cross section of the iron of the rotor and mounting ring so that the total flux produced by energization of the winding will be carried across the air gaps.

In prior clutches of this type, the cylindrical coil support surface defining one of the radial air gaps is formed on right angular flanges of equal diameters projecting in opposite directions from the short leg of the U-shaped cross section of the ring. This flanged construction has necessitated formation of the coil support ring as a single piece forging or extension followed by accurate machining of the surfaces to provide the desired uniform widths of the two air gaps

SUMMARY OF THE INVENTION

The primary objective of the present invention is to greatly reduce the cost of forming the coil supporting ring in a stationary field clutch of the above character while at the same time avoiding machining of the ring and providing for substantially uniform distribution and density of the flux across the air gaps. This objective is achieved by fabricating the coil support from two rings stamped out of sheet iron and nested and secured together with the oppositely projecting flanges formed around one periphery of the respective rings defining one air gap wall, the wall of the other air gap being defined by the other peripheries of the two rings and being formed by right angular flanges of different axial lengths and shaped to direct the total flux transaxially across the respective rings along parallel paths through the respective rings.

BRIEF DESCRIPTION OF THE DRAWINGS

FIG. 1 is a diametrical cross-sectional view of a magnetic friction clutch incorporating a composite magnetic ring embodying the novel features of the present invention.

FIG. 2 is a fragmentary similar cross section of the composite ring.

FIG. 3 is a perspective view of the ring.

FIG. 4 is a view of the magnet pole face taken along the line 4—4 of FIG. 1.

DESCRIPTION OF THE PREFERRED EMBODIMENT

In the magnetic friction clutch shown in the drawings to illustrate the present invention, the driving member 9 includes a cylindrical ring 10 surrounding and supported from a hub 11 through a bearing 12 disposed between a shoulder 13 and suitable snap rings 14. The hub is tapered and clamped by a screw 15 onto the end of a rotary driven shaft 16 journaled in and projecting from a stationary support 17. The outer end of the ring 10 is pressed at 10a into the inturned flange 18 of an L-shaped ring 19 having grooves 20 for receiving power driven belts. By forming concentric rows of slots 21 in the flange 18 as shown in FIG. 4 and separating the same by high reluctance sections 22, three concentric poles are formed at the exposed face of the pole flange.

Disposed opposite these pole faces is an armature ring 23 which is the driven member of the clutch and is supported concentric with the clutch axis through the medium of angularly spaced and radially disposed springs 24 having outer ends secured by angularly spaced rivets 24b, a flat ring 24a welded to the back of the armature. The inner ends of the spring arms are clamped against the outer end of the hub by a disk 24c and rivets 24d. Annular grooves 25 are formed in the armature face in registry with the rows of the slots 21.

Attraction of the armature into gripping engagement with the pole faces 26 occurs in response to energization of a generally cylindrical multiple turn winding 27 surrounding and secured to the longer leg of an L-shaped magnetic stationary ring generally indicated at 28 and providing inner and outer walls which are separated from the outer and inner walls 31 and 32 of the driving rings 19 and 10 by cylindrical air gaps 33 and 34. The latter are of narrow radial width and substantial areas and included in a flux circuit 35 of toroidal shape which threads back and forth through the pole faces 26 of the driving and driven rings as shown by the dotted line in FIG. 1.

The present invention involves a novel construction of the coil supporting ring 28 to enable the same to be formed at a greatly reduced cost which insures proper location and uniform widths of the air gaps and uniform distribution of the flux therethrough. To these ends, the composite ring 28 comprises two rings 36 and 37 which may be stamped from sheet metal with accurately dimensioned contours and with radial cross sections adapted to nest closely together and form the air gap walls of the proper areas and dimensions without the necessity of machining of the final assembly.

The ring 37 is of right angular Z-shaped cross section having one end flange 38, an oppositely projecting flange 39 and a connecting flat section 40 which is welded or otherwise secured rigidly to the outer peripheral edge of an apertured disk 30 surrounding the inner end of the stub shaft and secured to the support by a plurality of screws 42. The outside diameter of the flange 38 and the inside diameter of the flange 39 correspond to the desired diameters of the inner wall of the outer air gap 33 and the outer wall of the inner gap 34.

The ring 36 is of right angular J-shape with a short outer flange 41 alined axially but projecting in a direction opposite to the flange 38 when the closed end 42 of the J abutting the flat section 40 of the ring 37 and the adjacent part 43 of the long leg is telescoped closely within the flange 39 of the ring 37. The free end portion 44 of the long leg projects beyond the end of the flange 39, and, by virtue of a bend 45 intermediate the ends of the leg, the end portion 44 is offset inwardly relative to the part 43 and thus made of the same diameter as and axially alined with the flange 39 of the ring 37.

It will be apparent that the two rings 36 and 37 thus shaped are adapted to nest together closely and form the assembly shown in FIG. 3. After such assembly, the two rings are preferably secured together rigidly by copper brazing leaving a thin and uniform film 55 of nonmagnetic metal separating the abutting surfaces of the nested rings. The original diameters of the peripheral surfaces of both of the ring stampings are thus preserved so that the outer surfaces 46 and 47 of the oppositely projecting flanges 38 and 41 are of the same diameter and form the outer cylindrical wall of the outer air gap 33. Similarly, the inner surfaces 48 and 49 of the overlapping but radially offset flanges 39 and 44 are of the same diameter and define the outer wall of the inner air gap 34.

In the composite ring 28 thus formed, the rings 36 and 37 provide parallel parts 35a and 35b of the torodial flux circuit 35 extending between the two air gaps and radially through the intermediate sections 40 and 42 of the respective rings and then along the coacting flanges of the two rings. By stamping the rings 36 and 37 out of the same sheet metal stock, it will be apparent that the total flux created by energization of the winding 27 may be divided equally between the two paths 35a and 35b while providing uniform flux densities over the full areas of the two air gaps 33 and 34. Thus, the composite ring 28 possesses magnetic properties equal to the solid rings heretofore used in clutches of the present type.

The winding 27 is made in the form of an elongated cylinder of smaller outside diameter than the flanges 38 and 41 and is adapted to telescope over the bend 45 and abut against the end of the flange 41 as shown in phantom in FIG. 2. After such positioning, the winding is encapsulated by cold setting plastic material 51 and thus fastened securely to the composite ring 28. One terminal 52 of the winding is extended through a hole 53 in the ring 28 for connection with a suitable source of current.

I claim:

1. For use in a magnetic friction clutch of the character described, a coil support comprising a first ring stamped from sheet iron and Z-shaped in cross section having first and second flanges concentric with the ring axis and projecting axially in opposite directions from the inner and outer peripheries of the intermediate part of the ring, a second ring of J-shaped radial cross section stamped from sheet iron and abutting against said intermediate part of said first ring, said second ring having one peripheral flange concentric with and extending along said first flanges but projecting beyond the end of such flange and a second peripheral flange of the same diameter as said second flange and projecting axially in the opposite direction, said oppositely projecting flanges presenting a cylindrical peripheral surface of one diameter while the overlapping flanges of the two rings present a cylindrical peripheral surface of a different diameter.

2. A magnetic element as defined in claim 1 in which the projecting end portion of the flange of the second ring is bent transaxially beyond the end of the associated flange of the first ring to bring the cylindrical peripheral surface to the same diameter as the peripheral surface of the flange of the first ring.

3. A magnetic element as defined in claim 1 including means securing the abutting intermediate parts of said first and second rings securely together to thereby maintain the cylindrical surfaces of the two rings in precise axial alinement.

4. A magnetic element as defined in claim 1 in which the abutting parts of said first and second rings are brazed together by a film of nonmagnetic metal and the outer cylindrical surfaces of the inner and outer pairs of flanges are thereby maintained in precise axial alinement.

5. For use in a magnetic friction clutch of the character described, a coil support comprising first sheet metal rings having flanges concentric with the ring axis and projecting axially in opposite directions from the inner and outer peripheries of the ring, and a second sheet metal ring having flanges concentric with the ring axis and projecting axially in the same direction from the inner and outer peripheries of the ring, said rings being nested and secured together in endwise abutment with one pair of flanges on the respective rings projecting axially in opposite directions from the resulting composite ring and present axially spaced cylindrical peripheral surfaces of the same diameter while the pair of flanges are telescoped together and present axially spaced cylindrical peripheral surfaces of the same diameter but facing radially in the opposite direction from said first surfaces.

6. A coil support for a magnetic friction clutch as defined in claim 5 in which the sheet metal of each of said rings is of uniform thickness transaxially across the rings, the abutting surfaces of which are brazed together by a film of nonmagnetic metal.

7. For use in a friction clutch of the character described, a magnet having, in combination, a rotor having inner and outer pole pieces adapted at their ends for axial gripping engagement with an armature to derive a friction torque, said pole pieces having internal and external peripheral surfaces concentric with the rotor axis, a multiple turn annular winding disposed within said rotor between said pole pieces, and a magnetic element mounted stationarily between said pole pieces and supporting said winding, said element comprising stamped out rings of sheet iron nested together in end to end relation and providing separate parallel flux paths extending transaxially between said rotor surfaces, the ends of the flux path through one of said rings being defined by integral annular flanges concentric with said axis and projecting in opposite directions along the latter adjacent said peripheral surfaces, the ends of the flux path through the other ring being defined by annular flanges concentric with said axis and projecting in the same direction along the axis beyond one side of said first flanges.

8. A friction clutch as defined in claim 7 in which the peripheral surfaces on the flanges of the respective pairs being spaced substantially equidistant from said internal and external pole piece surfaces whereby to form radial air gaps between the pole pieces and the opposed surfaces of the pairs of flanges.

9. A friction clutch as defined in claim 7 in which said rings are separated and secured together by a layer of nonmagnetic material.

References Cited

UNITED STATES PATENTS 3,130,355  4/1964  Younger _____ 335—299
3,325,760  6/1967  Bernard _____ 335—281

GEORGE HARRIS, Primary Examiner

U.S. Cl. X.R.
192—84